(12) United States Patent
Hirao et al.

(10) Patent No.: US 6,237,357 B1
(45) Date of Patent: May 29, 2001

(54) VEHICULAR AIR CONDITIONER USING HEAT PUMP

(75) Inventors: Toyotaka Hirao; Makoto Fujitani, both of Nagoya (JP); Gregory A. Major, Beverly Hills; Xin Zeng, Auburn Hills, both of MI (US)

(73) Assignees: Mitsubishi Heavy Industries, Ltd., Tokyo (JP); General Motors Corporation, Detroit, MI (US)

( * ) Notice: Subject to any disclaimer, the term of this patent is extended or adjusted under 35 U.S.C. 154(b) by 0 days.

(21) Appl. No.: 09/326,608

(22) Filed: Jun. 7, 1999

(51) Int. Cl.$^7$ ............................................. F25B 29/00
(52) U.S. Cl. ....................... 62/325; 62/244; 62/239; 62/324.1
(58) Field of Search ............................ 62/244, 325, 239, 62/324.1

(56) References Cited

U.S. PATENT DOCUMENTS

| | | | |
|---|---|---|---|
| 4,149,389 | * 4/1979 | Hayes et al. | 62/79 |
| 4,439,995 | * 4/1984 | McCarty | 62/156 |
| 4,581,901 | * 4/1986 | Adams et al. | 62/234 |
| 4,656,839 | * 4/1987 | Cross et al. | 62/476 |
| 4,665,711 | * 5/1987 | Page | 62/238.3 |
| 5,355,689 | * 10/1994 | Hara et al. | 62/159 |
| 5,465,580 | * 11/1995 | Kwon | 62/6 |
| 5,711,163 | * 1/1998 | Uchikawa et al. | 62/324.6 |
| 5,899,086 | * 5/1999 | Noda et al. | 62/244 |

* cited by examiner

Primary Examiner—William Doerrler
Assistant Examiner—Mark Shulman
(74) Attorney, Agent, or Firm—Oblon, Spivak, McClelland, Maier & Neustadt, P.C.

(57) ABSTRACT

An object of the invention is to provide a vehicular air conditioner using a heat pump that can improve heating ability by effective utilization of engine waste heat during a heating operation.

The apparatus of the invention is a vehicular air conditioner using a heat pump with a compressor unit 20 equipped with a compressor 31, a throttling resistance 34 and a four way valve 33, connected by a refrigerant path 30 to an indoor heat exchanger 25 for effecting heat exchange between a refrigerant and vehicle cabin air, and an outdoor heat exchanger 21 installed in an engine compartment for effecting heat exchange between a refrigerant and outside air, and equipped with fan 22 for drawing in outside air, and which executes a cooling operation and a heating operation by switching a direction of flow of the refrigerant. During the heating operation, if the temperature of the engine compartment goes above a predetermined value, the fan 22 for drawing in outside air is reversed so that high temperature air is discharged from the engine compartment to the outside.

6 Claims, 4 Drawing Sheets

VEHICLE TRAVELING DIRECTION

---→ ;REFRIGERANT FLOW DIRECTION AT TIME OF COOLING/DEHUMIDIFYING OPERATION

——→ ;REFRIGERANT FLOW DIRECTION AT TIME OF HEATING OPERATION

VEHICULAR AIR CONDITIONER USING HEAT PUMP

BACKGROUND OF THE INVENTION

1. Field of the Invention

The present invention relates to a vehicular air conditioner using a heat pump, which is installed in vehicles such as automobiles.

2. Description of the Related Art

Recently, there has been an increasing demand for introducing a low-pollution vehicle and alternative energy vehicle, accompanied with demands for improving the air environment and environmental problems. When the energy source is replaced by natural gas, this is basically a change only in the fuel, and there is no need to change the basic structure of an air conditioning apparatus (hereinafter referred to as an air conditioner), since there is still an internal combustion engine (hereinafter referred to as an engine).

If however a conventional air conditioner is used as is, in an electric vehicle or a hybrid vehicle (using both an electric motor and an engine as a drive source) which is one of the strong candidates for the alternative energy vehicle, it is necessary to reconsider the heat source during the heating operation and the compressor drive source during the cooling operation.

That is to say, a problem arises in that during the heating operation, with electric vehicles there is no engine cooling water to serve as the heating source as in the conventional vehicles, and in hybrid vehicles there is a motor travelling mode in which the engine is stopped and the vehicle is driven only by the electric motor, and hence sufficient warm water cannot be obtained.

Moreover, during the cooling operation, the drive source for the compressor cannot rely only upon the engine as with conventional vehicles, and another drive source must be provided. For example, in the case of a hybrid vehicle, there is a motor travelling mode in which the vehicle is driven only by the electric motor, or even if the vehicle is driven by the engine, at the time of stopping, the engine is stopped so as not to run in idle. Hence stable operation of the air conditioner is not possible when only the engine is used as the drive source for the compressor.

From this background, a heat pump type air conditioner used in household cooling/heating air conditioners has been adopted as the air conditioner installed in vehicles such as the electric vehicles and hybrid vehicles.

FIG. 4 shows a schematic structural diagram of a conventional vehicular air conditioner using a heat pump. In the figure, numeral 1 denotes an indoor heat exchanger, 2 denotes a compressor unit, 3 denotes an outdoor heat exchanger, and 4 denotes a fan for drawing in outside air. In this case, the outdoor heat exchanger 3 is installed inside of an engine compartment together with the compressor unit 2 and the like. By activating the fan 4 for drawing in outside air 4, the outside air can be drawn into the engine compartment.

With the above described conventional construction, a refrigerant is circulated as described below to effect cooling and heating in the vehicle cabin.

The refrigerant during the heating operation circulates in a clockwise direction, as shown by the solid arrow in the figure. The refrigerant which is changed to a high-temperature and high-pressure gas by the compressor in the compressor unit 2 is sent to the indoor heat exchanger 1 to exchange heat with the air outside the vehicle (the outside air) or with the air inside the vehicle (the inside air). As a result, the outside air or the inside air (hereinafter referred to as intake air) becomes hot air by absorbing heat from the high-temperature and high-pressure gas refrigerant, and at the same time, the high-temperature and high-pressure gas refrigerant looses heat to be changed into a condensate, and becomes a high-temperature and high-pressure liquid refrigerant.

Subsequently, the high-temperature and high-pressure liquid refrigerant passes through the compressor unit 2 where it is expanded to become a low-temperature and low-pressure liquid refrigerant and is sent to the outdoor heat exchanger 3. In the outdoor heat exchanger 3, the low-temperature and low-pressure liquid refrigerant draws up heat from the outside air and is evaporated and gasified to become a low-temperature and low-pressure gas refrigerant. This low-temperature and low-pressure gas refrigerant is again sent to the compressor unit 2 and compressed, to become a high-temperature and high-pressure gas. Hereafter, the above described process is repeated.

That is to say, during the heating operation, the outdoor heat exchanger 3 functions as an evaporator, and the indoor heat exchanger 1 functions as a condenser.

If such a heating operation is continued, frost attaches to the outdoor heat exchanger 3, and sufficient heat exchange cannot be effected. Therefore, if a predetermined defrost condition is satisfied, a defrost operation is performed to melt the frost by switching the direction of flow of the refrigerant, that is, by making the refrigerant flow as in a cooling operation described later. With such a defrost operation, the outdoor heat exchanger 3 which functions as an evaporator during the heating operation functions as a condenser, and hence the frost can be melt by receiving heat from the refrigerant.

The refrigerant during the cooling/dehumidifying operation circulates in the counterclockwise direction as shown by the broken line arrow in the figure. The refrigerant which is changed to a high-temperature and high-pressure gas by the compressor in the compressor unit 2 is sent to the outdoor heat exchanger 3 to exchange heat with the outside air. As a result, the refrigerant gives up heat to the outdoor air and is changed into a condensate, becoming a high-temperature and high-pressure liquid refrigerant. The refrigerant which becomes the high-temperature and high-pressure liquid refrigerant as described above passes through a throttling resistance in the compressor unit 2 to become a low-temperature and low-pressure liquid refrigerant, and is then sent to the indoor heat exchanger 1.

Subsequently, the low-temperature and low-pressure liquid refrigerant absorbs heat from the intake air in the indoor heat exchanger 1 to cool the air. Hence cool air can be supplied to the vehicle cabin, and at the same time, the refrigerant itself is evaporated and gasified to become a low-temperature and low-pressure gas refrigerant. The refrigerant which becomes the low-temperature and low-pressure gas refrigerant is again sent to the compressor in the compressor unit 2, and compressed to become a high-temperature and high-pressure gas. Hereafter, the above described process is repeated. That is, during the cooling operation, the indoor heat exchanger 1 functions as an evaporator, and the outdoor heat exchanger 3 functions as a condenser.

With the above described conventional vehicular air conditioner using a heat pump, it is desirable effectively utilize the waste heat from the drive source (engine, electric motor, and the like) during the heating operation.

That is to say, under a situation of low outside air temperature, there is a case where it may be difficult to draw up a sufficient quantity of heat from the outside air using the heat pump, resulting in a problem in that the heating capacity of the air conditioner is not sufficient. For example, the temperature is not increased as desired, or it takes a long time to reach a desired temperature. Therefore, it is highly desirable to improve the heating ability by drawing up heat from engine waste heat or the like, which has been conventionally discarded, using the heat pump, and effectively utilizing this heat in the heating operation of the air conditioner, to thereby improve the marketability of the vehicular air conditioner.

Moreover, the above described defrost operation executes a cooling operation under situations where a heating operation is required. Therefore, from the viewpoint of providing a comfortable vehicle cabin environment to passengers, preferably the frequency of the defrost operations should be a minimum and these should be terminated within a short period of time. Furthermore, when the defrost operation is initiated or terminated, a four way valve is operated to change the flow direction of the refrigerant. At this time, since the high pressure side and the low pressure side is changed over, an abnormal sound occurs. The occurrence of this abnormal sound is undesirable for a vehicular air conditioner, and it is desired to take measures against such a problem. Solving such a problem during the defrost operation is a key issue for improving the marketability of the vehicular air conditioner.

SUMMARY OF THE INVENTION

In view of the above situation, it is an object of the present invention to improve the heating ability of the vehicular air conditioner by effective utilization of engine waste heat during the heating operation, and to solve the problems during the defrost operation, to thereby provide a highly marketable vehicular air conditioner using a heat pump.

To solve the above described problems, in the present invention, the following means are adopted.

A vehicular air conditioner using a heat pump according to a first aspect of the present invention is a vehicular air conditioner using a heat pump, with a compressor unit equipped with a compressor, a throttling resistance and a four way valve, connected by a refrigerant path to an indoor heat exchanger for effecting heat exchange between a refrigerant and intake air, and an outdoor heat exchanger installed in an engine compartment for effecting heat exchange between a refrigerant and outside air, and equipped with a fan for drawing in outside air, and which executes a cooling operation and a heating operation by switching a direction of flow of the refrigerant, wherein during the heating operation, if the temperature of the engine compartment goes above a predetermined value, the fan for drawing in outside air is reversed so that high temperature air is discharged from the engine compartment to the outside.

In this case, preferably the fan for drawing in outside air is installed in a vehicle body so as to draw in outside air from a side face of the vehicle body.

Moreover, when the fan for drawing in outside air is installed so as to draw in outside air from a front face of the vehicle body, reversing of the fan for drawing in outside air is only effected while the vehicle is stopped.

With such a vehicular air conditioner using a heat pump, when the temperature of the engine compartment is above a predetermined value, the fan for drawing in outside air is reversed, so that the high temperature air in the engine compartment flows to outside of the engine compartment through the outdoor heat exchanger. Therefore, the outdoor heat exchanger can draw up heat using the heat pump, from the air which has become a high temperature due to waste heat from the drive source such as engine waste heat.

If the fan for drawing in outside air is installed so as to draw in outside air from a side face of the vehicle body, then while the vehicle is travelling, reverse operation of the fan can be effected without being influenced by ram pressure.

A vehicular air conditioner using a heat pump according to a fourth aspect of the present invention is a vehicular air conditioner using a heat pump, with a compressor unit equipped with a compressor, a throttling resistance and a four way valve, connected by a refrigerant path to an indoor heat exchanger for effecting heat exchange between a refrigerant and intake air, and an outdoor heat exchanger for effecting heat exchange between a refrigerant and outside air, and which executes a cooling operation and a heating operation by switching a direction of flow of the refrigerant, wherein when a defrost operation is initiated or terminated during the heating operation, the four way valve is switched in a condition with the function of the compressor temporarily suspended.

In this case, the function of the compressor may be suspended by switching off (disconnecting) a clutch provided between the drive source and the compressor.

With to such a vehicular air conditioner using a heat pump, since the function of the compressor is suspended at the time of switching the four way valve, so that there is no pressure difference, the occurrence of an abnormal sound can be prevented.

A vehicular air conditioner using a heat pump according to a sixth aspect of the present invention is a vehicular air conditioner using a heat pump with a compressor unit equipped with a compressor, a throttling resistance and a four way valve, connected by a refrigerant path to an indoor heat exchanger for effecting heat exchange between a refrigerant and intake air, and an outdoor heat exchanger for effecting heat exchange between a refrigerant and outside air, and which executes a cooling operation and a heating operation by switching a direction of flow of the refrigerant, wherein if the vehicle is parked or stopped after executing the heating operation, the defrost operation is executed.

With such a vehicular air conditioner using a heat pump, since the defrost operation can be executed while the vehicle is parked or stopped, the frequency and the period of the defrost operations while the vehicle is travelling can be reduced.

DESCRIPTION OF THE PREFERRED EMBODIMENTS

As follows is a description of a hybrid vehicle mounted with a vehicular air conditioner using a heat pump, as one embodiment of the present invention, with reference to the appended drawings.

Figure 2:
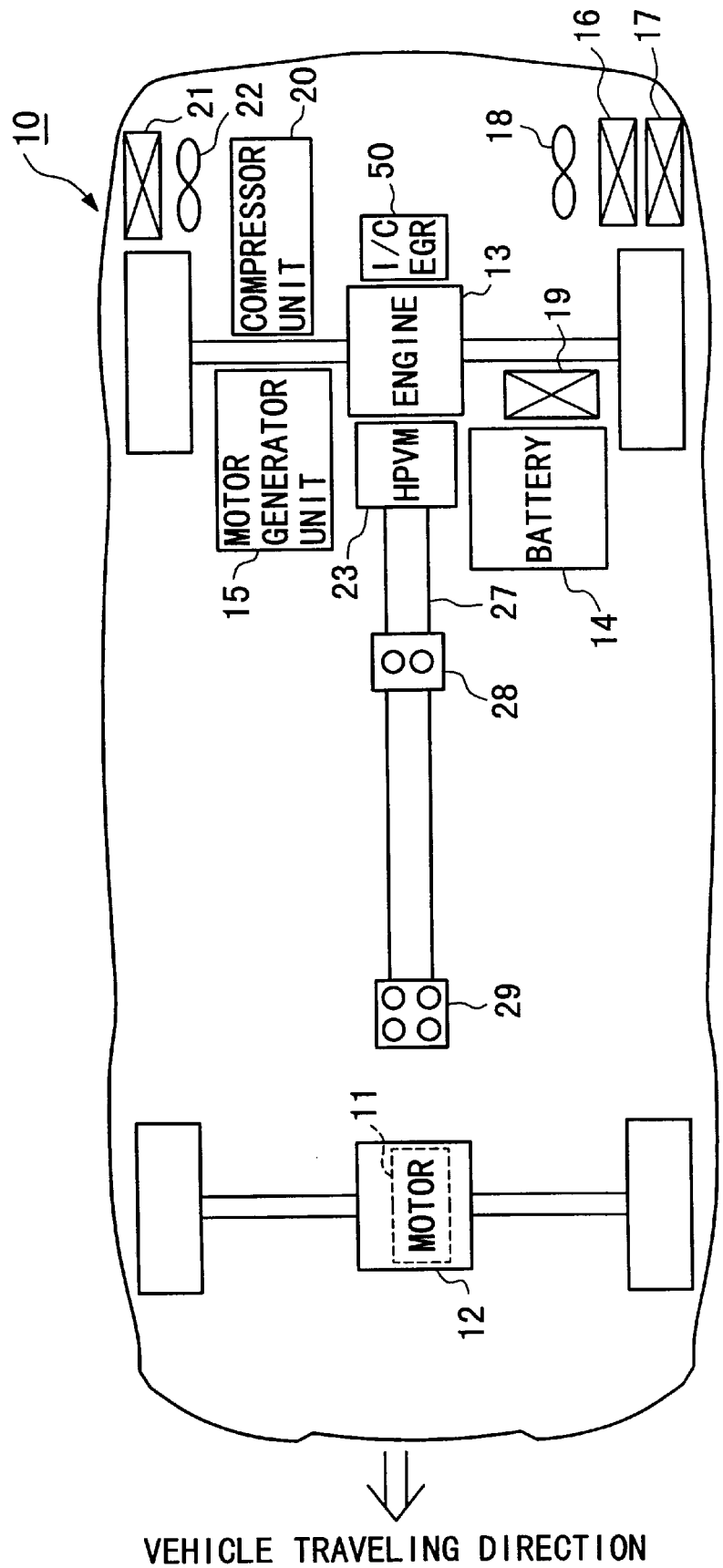
FIG. 2 is a plan view showing an arrangement of a hybrid vehicle mounted with the vehicular air conditioner using a heat pump shown in FIG. 1.

In FIG. 2, numeral 10 denotes a hybrid vehicle, equipped with a drive unit 12 in the front part of the vehicle body, having a motor housed therein for driving front wheels, and an engine 13 in an engine compartment in the rear part of the vehicle body, for driving rear wheels. The hybrid vehicle 10 runs as a front-wheel-drive vehicle at the time of low speed driving, using the motor 11 as a drive source, and runs as a rear-wheel-drive vehicle at the time of high speed driving exceeding a certain speed, by switching the drive source to the engine 13. Since the motor 11 is provided in the front part of the vehicle body, the engine 13 is arranged in the rear part of the vehicle body, in consideration of the freedom of installation space and reduction in air resistance (Cd value).

In addition, there is a case where the engine 13 and the motor 11 are activated as the drive source at the same time, to run as a four-wheel-drive vehicle.

In FIG. 2, numeral 14 denotes a battery which is a power source for the motor 11, and numeral 15 denotes a motor generator unit for converting the driving force of the engine 13 into electrical power and storing the electrical power in the battery 14. An electrical power generation motor (not shown) is mounted in the motor generator unit 15, and electrical power is generated by transmitting the driving force from the engine 13 to the electrical power generation motor. Moreover, the motor generator unit 15 has a function to convert electrical power stored in the battery 14 into the driving force, by driving the electrical power generation motor with the electrical power.

Numeral 50 denotes an I/C (inter-cooler) EGR system provided in the engine 13.

Numeral 16 denotes a radiator for cooling the engine 13, and 17 denotes a radiator for power elements, provided together with the radiator 16 for cooling the engine 13. The radiator 17 for the power elements is for cooling the driving motor 11, the motor generator unit 15 and the I/C EGR system 50. The radiator 16 for cooling the engine and the radiator 17 for the power elements are equipped with a radiator cooling fan 18 which passes outside air drawn in from the side face of the vehicle body through the radiators for cooling and thereby releases heat to the air in the inner periphery of the engine compartment (engine room).

Moreover, there is provided a battery heat exchanger 19 for transferring heat from the engine 13 to the battery 14.

Next is a description of an air conditioner mounted in the hybrid vehicle 10.

Figure 1:
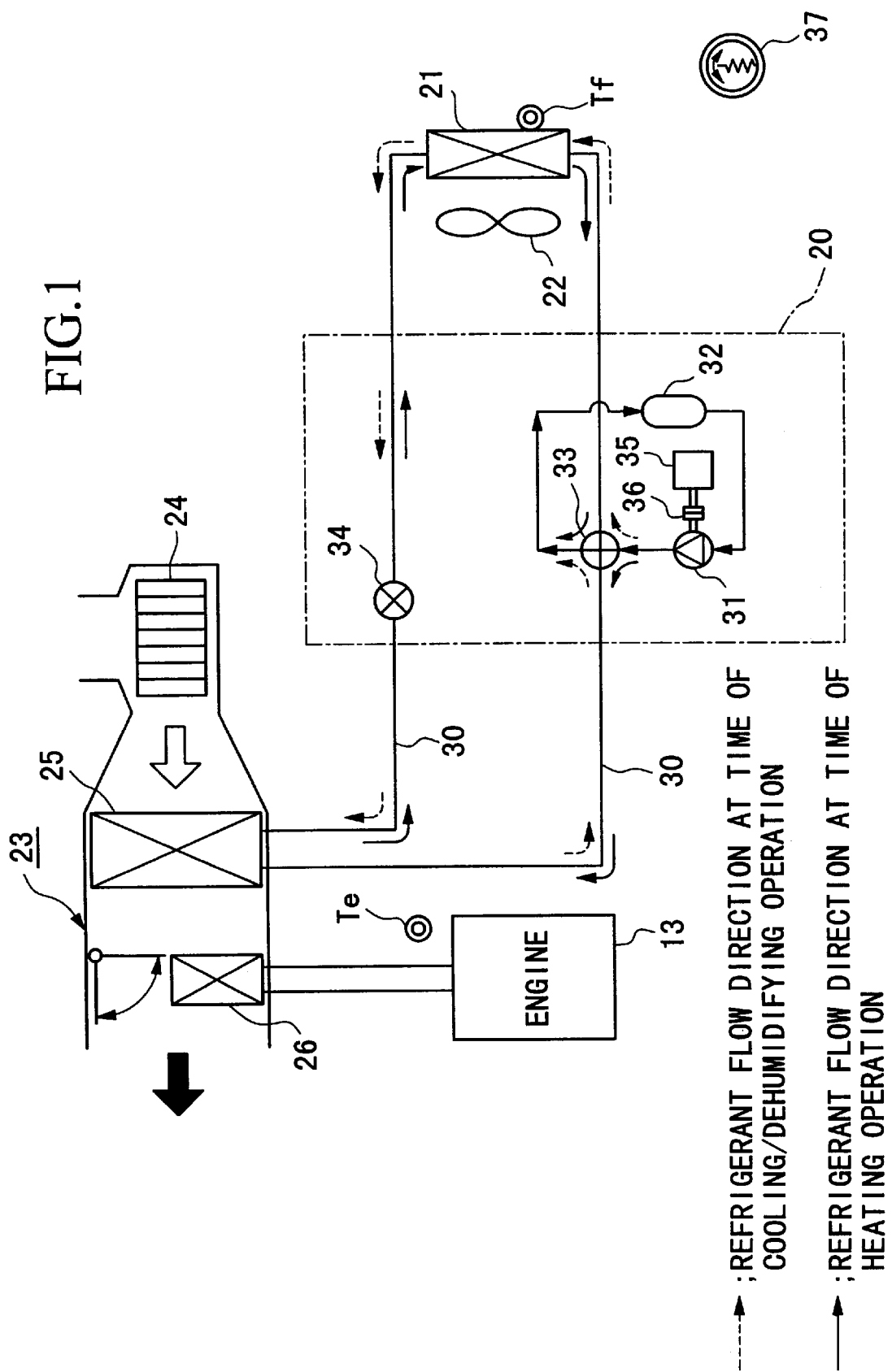
FIG. 1 is a schematic diagram showing a construction of a vehicular air conditioner using a heat pump according to one embodiment of the present invention.

In FIGS. 1 and 2, numeral 20 denotes a compressor unit for compressing a refrigerant, 21 denotes an outdoor heat exchanger, 22 denotes a fan for drawing in outside air, and 23 denotes a module referred to as an HPVM (Heat Pump Ventilating Module) which is internally provided with a blower fan 24, an indoor heat exchanger 25 and a heater core 26.

The outdoor heat exchanger 21 is arranged in the engine compartment disposed in the rear part of the vehicle body, that is, on the right side face in the engine room, for forcibly exchanging heat with outside air drawn in from an opening on the side face of the vehicle body by operation of the fan 22 for drawing in outside air. The HPVM 23 is arranged in the middle of the rear part of the vehicle body, with a front face connected to a duct 27 extending to the front of the vehicle body along a center of a lower part of the vehicle body. The duct 27 is formed in a tubular shape and is provided with air outlet sections 28 and 29 in the central portion and in the front end of the duct 27, respectively. In this case, the air outlet section 28 is for the rear seats, and the air outlet section 29 is for the front seats, but these may increased or decreased according to need.

The HPVM 23 is a module for executing cooling, heating and dehumidifying to effect air conditioning, by making outside air drawn in from outside the vehicle body or inside air drawn in from the vehicle cabin with the operation of the blower fan 24, pass through the indoor heat exchanger 25 and the heater core 26.

The indoor heat exchanger 25 is connected by a refrigerant path 30 to the compressor unit 20 and the outdoor heat exchanger 21 to constitute the air conditioner using a heat pump. The compressor unit 20 comprises a compressor 31, an accumulator 32, a four way valve 33 and a throttling resistance 34 such as an expansion valve, and operates the compressor 31 to circulate the refrigerant, to thereby execute the heat pump operation.

As follows is a description of the air conditioning operation by means of the air conditioner using a heat pump, considered separately for the cooling/dehumidifying operation and for the heating operation.

First, the heating operation will be described. The flow of the refrigerant at this time is in the clockwise direction in FIG. 1 (shown by the solid line arrow).

The compressor 31 draws in and compresses the low-temperature and low-pressure gas refrigerant and outputs this to the four way valve 33 as a high-temperature and high-pressure gas refrigerant. At this time, since the four way valve 33 is so set as to send the refrigerant to the indoor heat exchanger 25, the high-temperature and high-pressure gas refrigerant is sent to the indoor heat exchanger 25 through the refrigerant path 30, and heat is exchanged with indoor air or outdoor air drawn in by the blower fan 24 (hereinafter referred to as intake air) to warm the air. That is to say, the heat of the high-temperature and high-pressure gas refrigerant is absorbed by the intake air, and the high-temperature and high-pressure gas refrigerant is changed to a condensate and becomes a high-temperature and high-pressure liquid refrigerant. At the same time, the intake air passing through the indoor heat exchanger 25 is heated by this heat and supplied to the vehicle cabin as warm air. The indoor heat exchanger 25 in this case functions as a condenser.

The refrigerant exiting from the indoor heat exchanger 25 as the high-temperature and high-pressure liquid refrigerant is decompressed and expanded by the throttling resistance 34 in the compressor unit 20 to become a low-temperature and low-pressure liquid refrigerant, and is then sent to the outdoor heat exchanger 21 installed along the side face of the vehicle body. Outside air drawn in by the fan 22 for drawing in outside air passes through the outdoor heat exchanger 21, and the outdoor heat exchanger 21 exchanges heat with outside air to draw up the heat. Therefore, the low-temperature and low-pressure liquid refrigerant is warmed by the outside air which has a relatively higher temperature, and is evaporated and gasified to become a low-temperature and low-pressure gas refrigerant. The outdoor heat exchanger 21 in this case functions as an evaporator.

The refrigerant which has become the low-temperature and low-pressure gas is then sent to the four way valve 33 and directed to the accumulator 33 where the liquid component is removed, after which the gas is again drawn into the compressor 21 and compressed. Hereafter, the same refrigeration cycle is repeated to effect heating of the vehicle cabin.

Next is a description of the cooling operation. The flow of the refrigerant at this time is in the counterclockwise direction in FIG. 1 (shown by the broken line arrow).

The compressor 31 draws in and compresses the low-temperature and low-pressure gas refrigerant and outputs this to the four way valve 33 as a high-temperature and high-pressure gas refrigerant. At this time, since the four way valve 33 is so set as to send the refrigerant to the outdoor heat exchanger 21, the high-temperature and high-pressure gas refrigerant is sent to the outdoor heat exchanger 21 through the refrigerant path 30, and heat is exchanged with outside air drawn in by the fan 22 for drawing in outside air. As a result, the heat of the high-temperature and high-pressure gas refrigerant is absorbed by the outside air which has a relatively lower temperature, and the high-temperature and high-pressure gas refrigerant is changed to a condensate and becomes a high-temperature and high-pressure liquid refrigerant. The outdoor heat exchanger 21 in this case functions as a condenser.

Hereafter, the high-temperature and high-pressure liquid refrigerant is sent to the throttling resistance 34, and decompressed and expanded in passing through the throttling resistance 34 to become a low-temperature and low-pressure liquid refrigerant. The low-temperature and low-pressure liquid refrigerant is then sent to the indoor heat exchanger 25 and exchanges heat with the intake air drawn in by the blower fan 24, and absorbs heat from the intake air to effect cooling. As a result, the low-temperature and low-pressure liquid refrigerant is evaporated and gasified to become a low-temperature and low-pressure gas refrigerant. At the same time, the intake air becomes cool air and is supplied to the vehicle cabin. The indoor heat exchanger 25 in this case functions as an evaporator.

Moreover, the low-temperature and low-pressure gas refrigerant exiting from the indoor heat exchanger 25 is sent to the accumulator 32 through the four way valve 33, and the liquid component in the refrigerant is removed. The low-temperature low-pressure gas refrigerant is then again drawn into the compressor 31 from the accumulator 32 and compressed, after which the same refrigeration cycle is repeated to effect cooling of the vehicle cabin.

Furthermore, the HPVM 23 shown in FIG. 1 is equipped with a heater core 26. The heater core 26 has the function of introducing high-temperature engine cooling water from the engine 13 installed in the hybrid vehicle 10, to heat the passing intake air. That is to say, when the engine cooling water temperature goes above a predetermined value, the engine cooling water can be used as a supplementary heat source for heating.

The heater core 26 is not installed in an air conditioner using a heat pump, for an electric vehicle which does not have an engine 13 and hence cannot be supplied with hot water.

With the above described vehicular air conditioner using a heat pump, when the temperature of the engine room goes above a predetermined value during the heating operation, this is detected by a detection device such as a temperature sensor Te installed in an appropriate position in the engine room, and the fan 22 for drawing in outside air is reversed. That is to say, the rotation direction of the fan 22 for drawing in outside air is reversed so that the high-temperature air in the engine room is discharged to outside of the vehicle body. At this time, since the fan 22 for drawing in outside air is installed on the side of the vehicle body, the high-temperature air in the engine room can be discharged without being influenced by ram pressure, even during traveling.

The temperature in the engine room, due to waste heat such as radiant heat from the engine body 13 and heat radiated from the radiator 16, can be expected to rise to about 90° C. in summer when the outside temperature is high, and to 40 to 50° C. in winter when the outside temperature is very low.

When executing the reverse operation of the fan 22 for drawing in outside air, high-temperature air in the engine room passes in the reverse direction through the outdoor heat exchanger 21 which functions as an evaporator, and is discharged to outside of the vehicle body. Therefore, the low-temperature and low-pressure liquid refrigerant flowing through the outdoor heat exchanger 21 can draw up heat from the air having a considerably higher temperature than the outside air, under conditions where the heating operation is required due to low outside air temperature. Hence, efficient heat exchange can be performed, thereby improving the endothermic capacity of the outdoor heat exchanger 21, and improving the heating capacity of the heat pump.

That is to say, a heating operation utilizing the enthalpy of the air in the engine room due to the engine waste heat becomes possible. Hence the heating operation capacity, particularly when the outside temperature is low, can be greatly improved.

The above described reverse operation of the fan 22 for drawing in outside air is stopped and returned to the normal rotation operation, when it is detected that the temperature in the engine room goes below the predetermined value. A suitable temperature difference may be provided between the set temperature for terminating the reverse operation and the set temperature for initiating the reverse operation.

The above described embodiment is so constructed that the outdoor heat exchanger 21 is installed transversely on the rear side face of the hybrid vehicle 10, and the fan 22 for drawing in outside air draws in outside air from the side of the vehicle body. In another embodiment, however, the construction may be such that the outdoor heat exchanger 21 is installed in an engine compartment provided in the front part of the vehicle body, as with standard vehicles, to draw in outside air from the front of the vehicle body. That is to say, in the case of the above described hybrid vehicle 10, the outdoor heat exchanger 21 equipped with the fan 22 for drawing in outside air may be installed in the engine compartment in the front part of the vehicle body where the drive unit 12 having the motor 11 housed therein is installed. However this gives an increase in the front profile area and thus has a disadvantage from the standpoint of the Cd value. In such a case, since in general the wind due to traveling enters the engine compartment from the front grill so that there is an influence from the ram pressure, the reverse operation of the fan 22 for drawing in outside air is executed with an AND condition such that in addition to the temperature of the engine compartment going above a predetermined value, the vehicle must also be stopped.

To detect the stopped state of the vehicle, a signal may be received from a vehicle speed sensor normally used in vehicles.

The above described invention is not limited to the vehicular air conditioner using a heat pump mounted in a hybrid vehicle, which is described as the preferred embodiment, and may of course be applied to vehicles using an internal combustion engine as a drive source, and electric vehicles using an electric motor as a drive source.

In the case of an electric vehicle, since the electric motor or a battery becomes the heat source, the engine compartment in this case may be the space where the electric motor or battery is installed. That is, the reverse operation of the fan 22 for drawing in outside air may be executed with the outdoor heat exchanger 21 installed in the motor room.

Moreover, with the above described vehicular air conditioner using a heat pump, a defrost operation is required after continuous heating operation. The defrost operation is an operation for melting and removing frost attached to the outdoor heat exchanger 21 which functions as an evaporator. This operation executes a heat pump operation similar to the cooling operation where the refrigerant flows in the reverse direction to the heating operation, so that the outdoor heat exchanger 21 functions as a condenser.

Figure 3:
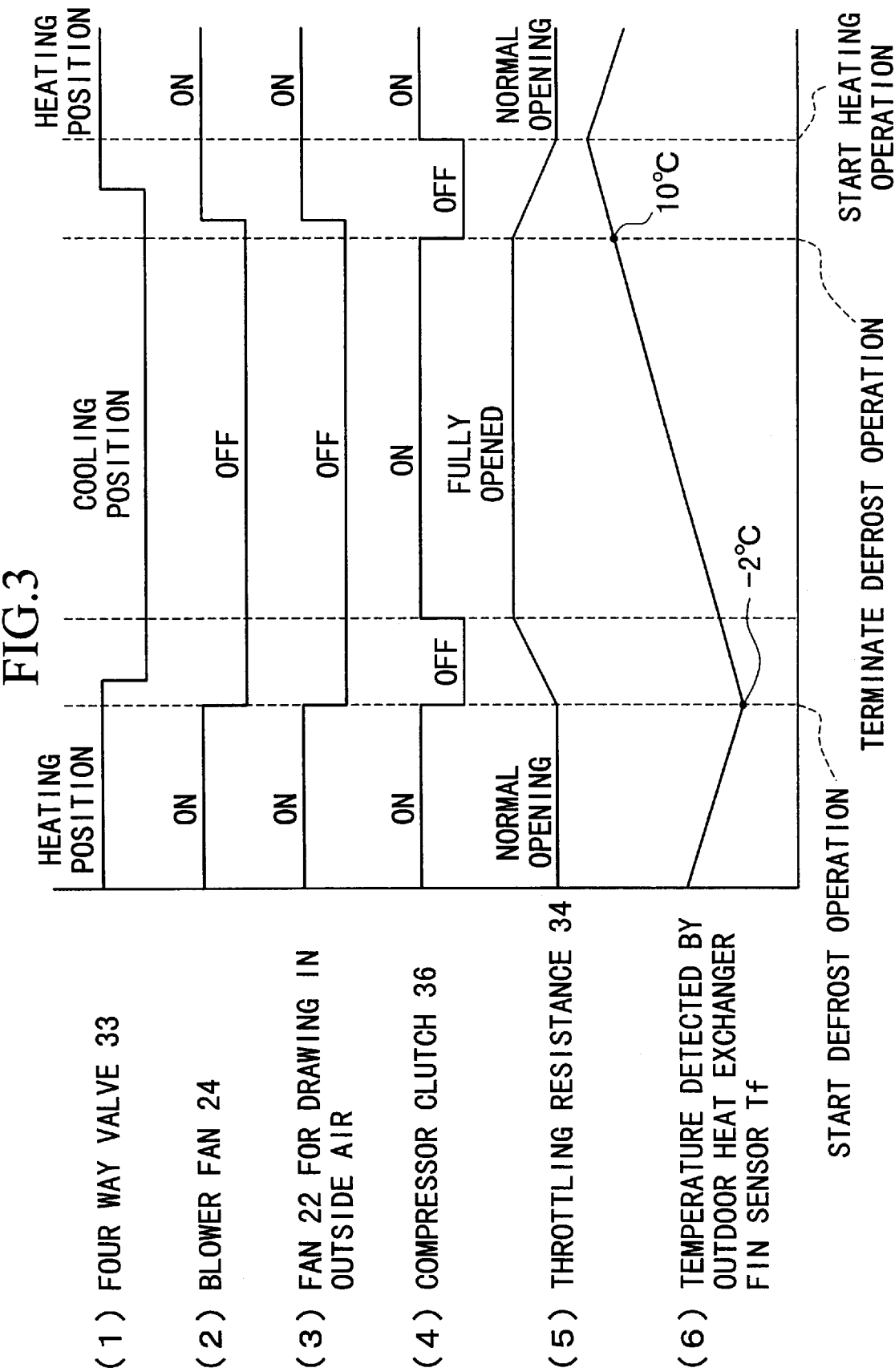
FIG. 3 is a time chart showing the operation of each constituent element during a defrost operation.
Figure 4:
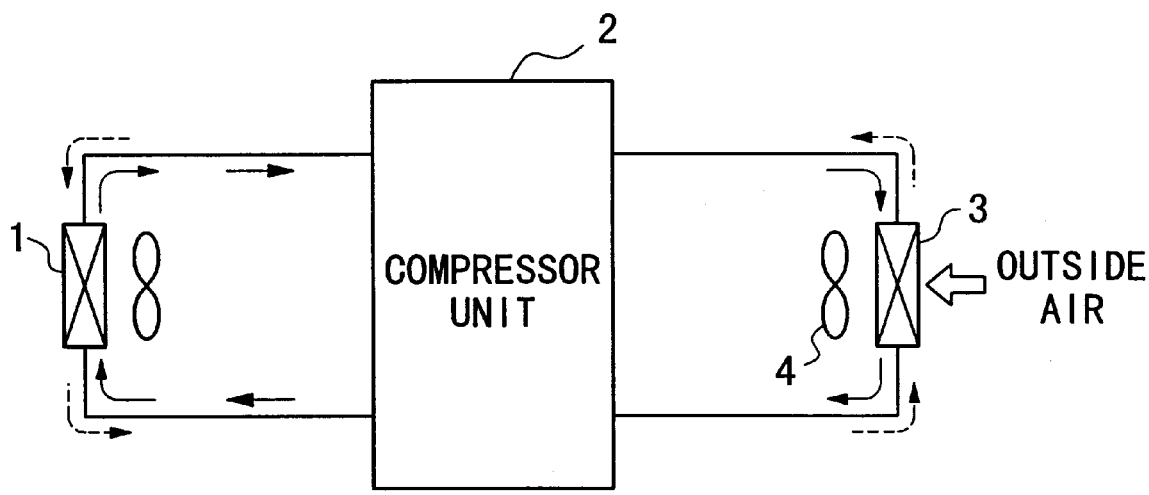
FIG. 4 is a schematic flow diagram showing a schematic construction of a vehicular air conditioner using a heat pump, being a conventional example.

The above described defrost operation is automatically switched from the heating operation, when the heating operation is continuous and a predetermined defrost condition is met. FIG. 3 shows a timing chart for the defrost operation. During the heating operation, the four way valve 33 is at a heating position, the blower fan 24 and the fan 22 for drawing in outside air are in the ON position, the compressor clutch 36 installed between the compressor 31 and the drive source 35 is in the connected (ON) state, and the throttling resistance 34 is at a normal opening.

Here a specific example of the defrost condition is shown, the setting being such that when an outdoor heat exchanger fin sensor (hereinafter referred to as a fin sensor) Tf attached to the outdoor heat exchanger 21 detects a low temperature below a set temperature (for example, -2° C.), and the continuous period of the heating operation reaches a set time (for example, 50 minutes or more), the defrost operation is initiated (under an AND condition). This defrost condition is only a specific example, and can be changed as appropriate.

When the defrost condition is met, and the defrost operation initiated, the blower fan 24 and the fan 22 for drawing in outside air are turned off, and the throttling resistance 34 is changed to the fully opened position. At the same time, the compressor clutch 36 is switched off so that the compressor 31 is temporarily isolated from the drive source 35 and stops operating as a compressor. In this case, stopping the fan 22 for drawing in outside air is effective in reducing the defrost operation period. On the other hand, stopping the blower fan 24 can prevent the outlet temperature to the vehicle cabin from dropping during the defrost operation.

Therefore, the is no pressure difference between the refrigerant paths 30 connected to the four way valve 33. Hence by switching the four way valve 33 from the heating position to the cooling position in this state, the abrupt flow of the gaseous refrigerant flows abruptly from the high pressure side to the low pressure side can be prevented. As a result, the gas flow sound generated when the gaseous refrigerant flows at high speed disappears, enabling a quiet switching operation without any abnormal sound. After the switching operation of the four way valve 33 has been completed, the compressor clutch 36 is switched on again to resume the operation of the compressor 31.

By resuming the operation of the compressor 31, the refrigerant flows in the counterclockwise direction as in the cooling operation to execute the defrost operation. Hence heat is supplied to the outside heat exchanger 21 to melt the frost attached around the outside heat exchanger 21. Such a defrost operation terminates when the defrost termination condition is met. As a specific example of the defrost termination condition, only one of two conditions need be satisfied, namely the temperature detected by the fin sensor Tf goes above a set temperature (for example 10° C.), or the continuous period of the defrost operation exceeds a set time (for example, 9 minutes). In this case, the reason for having the OR condition of the continuous period of the defrost operation is to prevent the defrost operation from continuing on if there is a fault in the fin sensor Tf.

When the defrost termination condition is met, the compressor clutch 36 is first switched off to stop the operation of the compressor 31. As a result, there is no pressure difference between the refrigerant paths 30 connected to the four way valve 33. Hence in this condition, if the four way valve 33 is switched from the cooling position to the heating position, no abnormal sound is generated.

Moreover, the blower fan 24 and the fan 22 for drawing in outside air are switched on shortly after the compressor clutch 36 has been switched off, and the throttling resistance 34 changed from the fully opened position to the normal position. Then, by again switching on the compressor clutch 36, the operation of the compressor 31 is resumed, and the refrigerant flows in the flow direction for the heating operation to initiate the heating operation.

The above described defrost operation is also automatically executed when the vehicle is parked or stopped. The defrost operation in this case is of course executed only when the heating operation has been executed during traveling. For example, the defrost operation is initiated by judging the parked/stopped state when a key is pulled out from an engine key operation section 37. The defrost operation may be terminated according to the above described defrost termination condition. However, this may be set so as to terminate in a shorter period of time, considering that frost will not be attached in as large an amount as when the defrost condition during traveling is met. Moreover, when the temperature detected by the fin sensor Tf goes above a predetermined value, or when the continuous period of the heating operation is not longer than a predetermined value, it may be judged that the defrost operation is not required, and the defrost operation may then not be executed while parked or stopped.

By executing the defrost operation while parked or stopped, the period when the vehicle is not traveling can be effectively utilized for removing the frost. Hence the frequency and the period of the defrost operations during traveling can be reduced. That is, the defrost operation in which the cooling operation is executed under the situation where the heating operation is required, and which is thus undesirable for passengers in the vehicle cabin, can be kept to a minimum.

As described above, with the vehicular air conditioner using a heat pump of the present invention, since the setting is such that when the temperature in the engine compartment goes above a predetermined value during the heating operation, the fan for drawing in outside air is reversed, then highly efficient heat absorption becomes possible by means of the heat pump by effectively utilizing the enthalpy of the air in the engine compartment. Therefore, the heating operation capacity can be improved especially when the outside temperature is low so that air conditioning operation sensitive to requirements can be executed to provide passengers with a comfortable environment in the vehicle cabin, thus effectively improving marketability of the vehicular air conditioner using a heat pump.

Moreover, the gas flow sound of the refrigerant at the time of initiating and terminating the defrost operation can be prevented. Furthermore, the defrost operation during traveling can be kept to a minimum, enabling an improvement in marketability of the vehicular air conditioner using a heat pump.

What is claimed is:

1. A vehicular air conditioner using a heat pump, with a compressor unit equipped with a compressor, a throttling resistance and a four way valve, connected by a refrigerant path to an indoor heat exchanger for effecting heat exchange between a refrigerant and intake air, and an outdoor heat exchanger installed in an engine compartment for effecting heat exchange between a refrigerant and outside air, and equipped with a fan for drawing in outside air through the outdoor heat exchanger, and which executes a cooling operation and a heating operation by switching a direction of flow of said refrigerant, wherein during said heating operation, if the temperature of said engine compartment goes above a predetermined value, said fan for drawing in outside air is reversed so that high temperature air is discharged from said engine compartment to an outside.

2. A vehicular air conditioner using a heat pump according to claim 1, wherein said fan for drawing in outside air is installed in a vehicle body so as to draw in outside air from a side face of the vehicle body.

3. A vehicular air conditioner using a heat pump according to claim 1, wherein said fan for drawing in outside air is installed in a vehicle body so as to draw in outside air from a front face of the vehicle body.

4. A vehicular air conditioner using a heat pump, with a compressor unit equipped with a compressor, a throttling resistance and a four way valve, connected by a refrigerant path to an indoor heat exchanger for effecting heat exchange between a refrigerant and intake air, and an outdoor heat exchanger for effecting heat exchange between a refrigerant and outside air, and which executes a cooling operation and a heating operation by switching the four way valve to change a direction of flow of said refrigerant, wherein when a defrost operation is initiated or terminated during the heating operation, said four way valve is switched in a condition with the function of said compressor temporarily suspended.

5. A vehicular air conditioner using a heat pump according to claim 4, wherein said compressor function is suspended by switching off a clutch provided between a drive source and the compressor.

6. A vehicular air conditioner using a heat pump, with a compressor unit equipped with a compressor, a throttling resistance and a four way valve, connected by a refrigerant path to an indoor heat exchanger for effecting heat exchange between a refrigerant and intake air, and an outdoor heat exchanger for effecting heat exchange between a refrigerant and outside air, and which executes a cooling operation and a heating operation by switching a direction of flow of said refrigerant, wherein if the vehicle is parked or stopped after executing the heating operation, the defrost operation is executed.

* * * * *